Figure 1:
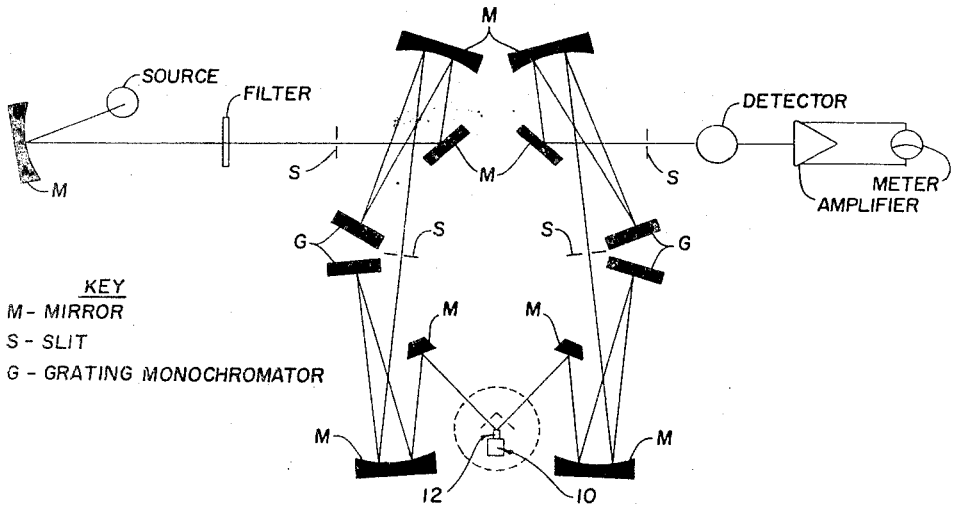
Figure 2:
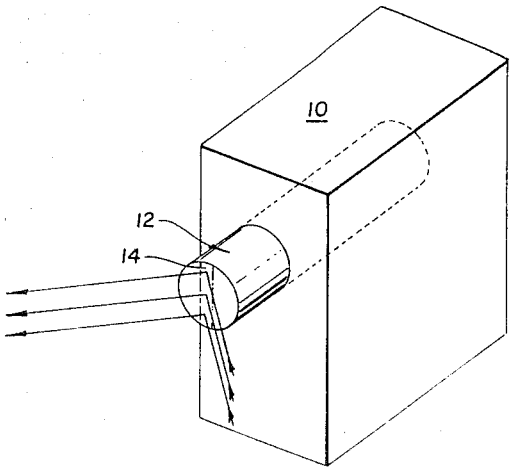

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 4, 1975

931 O.G. 9

T931,005

METHOD OF MONITORING PLASTICIZER CONCENTRATION IN FILTER TOW BY MEASURING FLUORESCENCE INTENSITY

Ethbert S. Carr, Jr., 4043 Skyland Drive 37664, and Gerald P. Morie, 2317 Briar Cliff Road 37660, both of Kingsport, Tenn.

Filed May 6, 1974, Ser. No. 467,523
**Int. Cl. G01n *21/16***
U.S. Cl. 250—302
1 Sheet Drawing. 12 Pages Specification

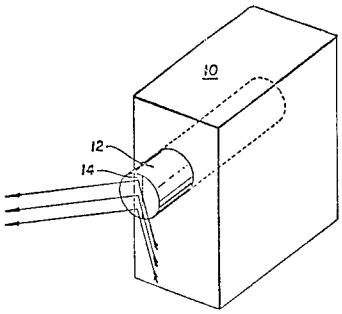

Method of monitoring the bonding plasticizer concentration in the filter tow of a tobacco smoke filter rod by adding a predetermined amount of fluorescent agent to a predetermined amount of plasticizer; applying to the filter tow prior to its being formed into a filter rod the bonding plasticizer and the added fluorescent agent; and measuring the intensity of fluorescence from a predetermined portion of one end of the subsequently formed filter rod. The measurement made has thus been found to be representative of a percentage of bonding plasticizer in the entire length of filter rod. The bonding plasticizer applied to the filter tow may be preferably triacetin and the fluorescent agent added to the bonding plasticizer may be preferably butylated hydroxyanisole (BHA). More specifically, the bonding plasticizer may be a member of a group consisting of glyceryl triacetate (triacetin), ethylene glycol diacetate, triethylene glycol diacetate, propylene glycol diacetate, di(methoxyethyl)phthalate, dimethyl phthalate, and triethyl citrate. The fluorescent agent may be a member of the group consisting of propyl 3,4,5-trihydroxybenzoate, 3,5-di-t-butyl-4-hydroxymethyl benzene, 2,5-bis(5,7-di - tert - amylbensonasol-2-yl) thiophene, riboflavin, butylated hydroxyanisole, benzoic acid, 2-acetonaphthone, benzophenone, propyl p-hydroxybenzoate and 2,4,5-trihydroxybutyrophenone. With respect to the composition of glyceryl triacetate (triacetin) and butylated hydroxyanisole (BHA), 1000 parts of BHA may be added to one million parts of triacetin.

METHOD OF MONITORING PLASTICIZER CONCENTRATION IN FILTER TOW BY MEASURING FLUORESCENCE INTENSITY

Filed May 6, 1974